United States Patent
Baba et al.

(10) Patent No.: US 6,346,556 B2
(45) Date of Patent: Feb. 12, 2002

(54) SILICONE RUBBER SPONGE COMPOSITION, SPONGE, AND PROCESS FOR MAKING

(75) Inventors: Katsuya Baba; Manabu Suto; Akito Nakamura, all of Chiba Prefecture (JP)

(73) Assignee: Dow Corning Toray Silicone Company, Ltd., Tokyo (JP)

( * ) Notice: Subject to any disclaimer, the term of this patent is extended or adjusted under 35 U.S.C. 154(b) by 0 days.

(21) Appl. No.: 09/826,990

(22) Filed: Apr. 5, 2001

(30) Foreign Application Priority Data

Apr. 28, 2000 (JP) ........................................ 2000-131637

(51) Int. Cl.⁷ .................................................. C08J 9/32
(52) U.S. Cl. .............................. 521/54; 521/64; 521/65; 521/79; 521/81; 521/134; 521/154
(58) Field of Search ............................ 521/79, 81, 54, 521/134, 154, 65, 64

(56) References Cited

U.S. PATENT DOCUMENTS 3,865,759 A * 2/1975 Smith ......................... 521/154
4,686,244 A * 8/1987 Dietlein et al. ............. 521/154
4,719,249 A * 1/1988 Dietlein et al. ............. 521/154
5,135,960 A   8/1992 Higuchi et al. ............... 521/76

FOREIGN PATENT DOCUMENTS

| JP | 44-461 | 6/1963 |
| JP | 7-122000 | 8/1993 |

* cited by examiner

Primary Examiner—Morton Foelak
(74) Attorney, Agent, or Firm—James L. De Cesare

(57) ABSTRACT

A silicone rubber sponge composition, a silicone rubber sponge, and a process for production thereof. The silicone rubber sponge composition comprises (A) 100 parts by weight organopolysiloxane gum described by average structural unit $R_a SiO_{(4-a)/2}$, where R is a monovalent hydrocarbon group or haloalkyl and a is 1.8 to 2.3 and having a viscosity at 25° C. of 1,000,000 mPa·s or above, (B) 1 to 400 parts by weight inorganic filler, (C) 0.01 to 50 parts by weight hollow thermoplastic resin particles, (D) 0.01 to 10 parts by weight a water-in-oil emulsion with silicone oil an oil phase, and (E) a curing agent in an amount sufficient to cure the composition.

14 Claims, No Drawings

SILICONE RUBBER SPONGE COMPOSITION, SPONGE, AND PROCESS FOR MAKING

FIELD OF THE INVENTION

The present invention relates to a silicone rubber sponge composition, to a silicone rubber sponge, and to a process for production thereof. More particularly, it relates to a silicone rubber sponge composition that gives a silicone rubber sponge having fine, uniform cells, to a silicone rubber sponge, and to a process for production thereof.

BACKGROUND OF THE INVENTION

Due to their outstanding heat and weather resistance and light weight, silicone rubber sponges are used for automotive parts, such as packings, gaskets, and O-rings; sheath materials for rollers in copiers; gaskets for construction use such as joint fillers and sealers; and various sealing and cushioning applications. A number of silicone rubber sponge compositions have been proposed to date. Patent Publication 44-461 and Patent Application Laying Open 7-247436, for example, teach heat curing silicone rubber sponge compositions containing thermally decomposable organic blowing agents such as azobisisobutyronitrile. However, these compositions give rise to harmful decomposition products during sponge production and thus pose an environmental problem. Patent Publication 7-122000 proposes a silicone rubber sponge composition comprising an oil-in water type emulsion consisting of dimethylpolysiloxane, an emulsifier, water, and a thickener. However, this composition does not readily give silicone rubber sponges with uniform cells. Further, since oil-in water type emulsions and silicone rubber compositions are basically immiscible, the process of evenly dispersing the silicone rubber composition throughout the silicone rubber composition is time consuming and throughput is poor.

It is an object of the present invention to provide a silicone rubber sponge composition that gives a silicone rubber sponge having fine, uniform cells, a silicone rubber sponge, and a process for production thereof.

SUMMARY OF THE INVENTION

The present invention relates to a silicone rubber sponge composition, a silicone rubber sponge, and a process for production thereof. The silicone rubber sponge composition comprises (A) 100 parts by weight organopolysiloxane gum described by average structural unit $R_aSiO_{(4-a)/2}$, where R is a monovalent hydrocarbon group or haloalkyl and a is 1.8 to 2.3 and having a viscosity at 25° C. of 1,000,000 mPa·s or above, (B) 1 to 400 parts by weight inorganic filler, (C) 0.01 to 50 parts by weight hollow thermoplastic resin particles, (D) 0.01 to 10 parts by weight water-in-oil emulsion with silicone oil as an oil phase, and (E) a curing agent in an amount sufficient to cure the composition.

DESCRIPTION OF THE INVENTION

A first embodiment of the present invention is a silicone rubber sponge composition comprising (A) 100 parts by weight organopolysiloxane gum described by average structural unit $R_aSiO_{(4-a)/2}$, where R is a monovalent hydrocarbon group or haloalkyl and a is 1.8 to 2.3 and having a viscosity at 25° C. of 1,000,000 mPa·s or above, (B) 1 to 400 parts by weight inorganic filler, (C) 0.01 to 50 parts by weight hollow thermoplastic resin particles, (D) 0.01 to 10 parts by weight water-in-oil emulsion with silicone oil as an oil phase, and (E) a curing agent in an amount sufficient to cure the composition.

A second embodiment of the present invention is a silicone rubber sponge produced by heat curing of the silicone rubber sponge composition. A third embodiment of the present invention is a process for production of a silicone rubber sponge composition comprising the steps of combining components (A) and (B) to produce a silicone rubber base compound and incorporating components (C), (D), and (E) into the silicone rubber base compound. A fourth embodiment of the present invention is a process for production of a silicone rubber sponge comprising the step of curing the present composition by heating to a temperature equal to or above the softening point of the thermoplastic resin of component (C).

Component (A) is the principal component of the present composition. It must have a viscosity at 25° C. of 1,000,000 mPa·s or above and preferably 5,000,000 mnPa·s or above. Component (A) is a gum at normal temperature and has a Williams plasticity of 50 or greater, preferably 100 or greater, and more preferably 120 or greater. The degree of polymerization of component (A) is typically 3,000 to 20,000, with the weight-average molecular weight being $20 \times 10^4$ or above. The class of compounds known as organopolysiloxane gums used as the principle component in organic peroxide-curing millable compositions can be used for component (A). Component (A) consists of an organopolysiloxane gum described by average unit formula $R_aSiO_{(4-a)/2}$, where R is a monovalent hydrocarbon group or haloalkyl and a is 1.8 to 2.3. Monovalent hydrocarbon groups represented by R include alkyls such as methyl, ethyl, and propyl; alkenyls such as vinyl and allyl; cycloalkyls such as cyclohexyl; aralkyls such as β-phenylethyl; and aryls such as phenyl and tolyl. Haloalkyl groups represented by R include 3,3,3-trifluoropropyl and 3-chloropropyl.

Where the curing agent consists of either an alkyl peroxide or a platinum catalyst used concomitantly with an organopolysiloxane containing silicon-bonded hydrogen atoms, the organopolysiloxane gum molecule must have at least two silicon-bonded alkenyls. Alkenyl here refers, for example, to vinyl, ally, propenyl, and hexenyl groups. The molecular structure of component (A) may be linear or linear containing branches. Component (A) may be a homopolymer, copolymer, or a blend of polymers. Specific examples of the siloxane units of component (A) are dimethylsiloxane, methylvinylsiloxane, methylphenylsiloxane, and (3,3,3-trifluoropropyl) methylsiloxane. Endgroups present on the molecular chain terminals of component (A) include, for example, trimethylsiloxy, dimethylvinylsiloxy, methylvinylhydroxysiloxy, and dimethylhydroxysiloxy groups. Examples of such organopolysiloxane gums include methylvinylpolysiloxane gum endblocked at both terminals with trimethylsiloxy groups, a copolymer gum of methylvinylsiloxane and dimethylsiloxane endblocked at both terminals with trimethylsiloxy groups, dimethylpolysiloxane gum endblocked at both terminals with dimethylvinylsiloxy groups, a copolymer gum of methylvinylsiloxane and dimethylsiloxane endblocked at both terminals with dimethylvinylsiloxy groups, a copolymer gum of methylvinylsiloxane and dirnethylsiloxane endblocked at both terminals with dimethylhydroxysiloxy groups, a copolymer gum of methylphenylsiloxane, methylvinylsiloxane and dimethylsiloxane endblocked at both terminals with methylvinylhydroxysiloxy groups, and a copolymer gum of (3,3,3-trifluoropropyl)methylsiloxane, methylvinylsiloxane and dimethylsiloxane that is endblocked at both terminals with methylvinylhydroxysiloxy groups.

Examples of the inorganic filler of component (B) are reinforcing fillers such as finely divided silica (e.g. dry process silica or wet process silica) and finely divided silica whose surfaces have been rendered hydrophobic through treatment with an organochlorosilane, organoalkoxysilane, hexaorganodisilazane, organosiloxane oligomer, or the like; and semi-reinforcing or extending fillers such as powdered quartz, diatomaceous earth, heavy calcium carbonate, light calcium carbonate, magnesium oxide, calcium silicate, mica, aluminum oxide, aluminum hydroxide, carbon black, and the like. In excessively large amounts component (B) is difficult to incorporate into component (A) and accordingly the preferred range is 1 to 400 parts by weight per 100 parts by weight of component (A), preferably from 1 to 100 parts by weight for the reinforcing fillers and from 1 to 150 parts by weight for the semi-reinforcing or extending fillers.

The hollow thermoplastic resin particles used for component (C) serve as nuclei for cell formation and also make the cell distribution uniform. An exemplary component (C) is a material consisting of thermoplastic resin shells having an inert gas enclosed therein. Thermoplastic resins include silicone resins, acrylic resins, and polycarbonate resins. In preferred practice, the thermoplastic resin will have a softening point of from 40 to 200° C., and especially 60 to 180° C. Inert gases include air, nitrogen gas, helium gas, and the like. Component (C) average particle size is preferably within the range of 0.1 to 500 $\mu$m, and more preferably 1 to 50 $\mu$m. Component (C) may be prepared, for example, by spraying an aqueous dispersion of a thermoplastic resin dissolved in a solvent from a spray nozzle into a heated air stream and evaporating the organic solvent while granulating the thermoplastic resin. Component (C) is included in amounts of 0.01 to 50 parts by weight, preferably 0.1 to 40 parts by weight, per 100 parts by weight of component (A).

Component (D), a water-in-oil emulsion with silicone oil as the oil component is a characterizing feature of the present composition and is essential in terms of creating fine, uniform cells. Component (D) can be prepared easily by dispersing a silicone oil in water using a surfactant.

The silicone oil forming the oil component of component (D) is an oligomer or polymer whose backbone is composed of diorganosiloxane units. It may be of liquid form, but is not limited to this kind. A typical example of the silicone oil is diorganosiloxanes described by general formula

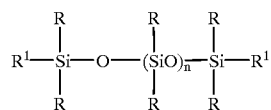

where R is a monovalent hydrocarbon group or haloalkyl and $R^1$ is R or hydroxyl. Monovalent hydrocarbon groups represented by R include alkyls such as methyl, ethyl, propyl, butyl, pentyl, and hexyl; alkenyls such as vinyl, allyl, and hexenyl; cycloalkyls such as cyclohexyl; aralkyls such as P-phenylethyl; and aryls such as phenyl. Haloalkyl groups represented by R include 3-chloropropyl and 3,3,3-trifluoropropyl. Of the alkyl groups, methyl is preferred. The subscript n is an integer of 0 or greater. The silicone oil of component (D) can have a viscosity at 25° C. of from 1 to 100,000 mPa·s and preferably from 10 to 100,000 mPa·s.

The surfactant used in component (D) can be any surfactant capable of producing a water-in-oil emulsion and the type is not critical provided that curing of the present composition is not hampered. Examples of surfactants capable of producing water-in-oil emulsions include diorganopolysiloxanes having polyoxyalkylene groups described by the following molecular formula on side chains

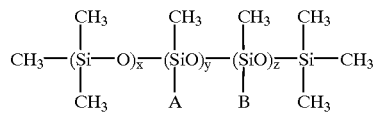

where x and y are integers of 1 or greater, z is 0 or an integer of 1 or greater, A is a group described by general formula —$(CH_2)_a$—O—$(C_2H_4O)_p(C_3H_6O)_q R^2$; where a is an integer from 1 to 3, p is an integer of 1 or greater, q is 0 or an integer of 1 or greater, $R^2$ is hydrogen or a $C_{1-4}$ alkyl, and B is —$(CH_2)_n$—$CH_3$ where n is an integer of 7 to 23. Other examples of surfactants useful in the present composition include dimethylpolysiloxanes having polyoxyalkylene groups of formula A, as described above, at their molecular chain terminals, polyoxyethylene sorbitol fatty acid esters, polyethylene glycol fatty acid esters, polyoxyethylene alkyl ethers, polyoxyethylene alkylphenyl ethers, and other nonionic surfactants; as well as mixtures of the above polyoxyalkylene group-containing organopolysiloxanes with the above nonionic surfactants.

The water can be any type of "highly pure" water such as distilled or deionized water or the like.

Component (D) is used in the present composition in an amount of from 0.01 to 10 parts by weight, preferably 0.1 to 5 parts by weight, per 100 parts by weight of component (A). With amounts of component (D) less than 0.01 parts by weight the silicone rubber sponge will not have a satisfactory expansion coefficient, while amounts exceeding 10 parts by weight may result in problems such as hindered curing.

Component (E), the curing agent, is an organic peroxide, or a platinum catalyst plus an organopolysiloxane containing silicon-bonded hydrogen. Examples of the former type, namely organic peroxides, include benzoyl peroxide, t-butyl perbenzoate, o-methyl benzoyl peroxide, p-methyl benzoyl peroxide, m-methyl benzoyl peroxide, dicumyl peroxide, and 2,5-dimethyl-2,5-di(t-butylperoxy)hexane. The amount of the organic peroxide is preferably 0.1 to 10 parts by weight per 100 parts by weight of component (A).

When component (E) is a platinum catalyst plus an organopolysiloxane containing silicon-bonded hydrogen, examples of the platinum catalyst are finely divided platinum, platinum black, chloroplatinic acid, alcohol-modified chloroplatinic acid, chloroplatinic acid olefin complexes, chloroplatinic acid/diketone complexes, and chloroplatinic acid/1,3-divinyltetramethyldisiloxane complexes. In preferred practice, the amount of platinum catalyst, expressed as metallic platinum, is from 0.1 to 500 ppm (weight basis) of the total composition. Organopolysiloxanes containing silicon-bonded hydrogen are crosslinking agents and in the presence of platinum catalysts react with the alkenyl groups in component (A) to cure the present compositions. Examples of organopolysiloxanes containing silicon-bonded hydrogen are methylhydriosiloxane endblocked at both terminals with trimethylsiloxy groups, a copolymer of methylhydriosiloxane and dimethylsiloxane endblocked at both terminals with trimethylsiloxy groups, a copolymer of methylhydriosiloxane and dimethylsiloxane endblocked at both terminals with dimethylhydriosiloxy groups, and tetramethyltetrahydriocyclotetrasiloxane. In preferred practice the amount of the organopolysiloxane containing silicon-bonded hydrogen will be such that the molar ratio of silicon-bonded hydrogen to the alkenyl groups in component (A) is 0.5:1 to 10:1. Compounds known in the art as agents for regulating the catalytic activity of platinum catalysts such as 1-ethynyl-cyclohexanol, 3-methyl-1-penten-3-ol, or benzotriazole, may be added as well.

The present composition comprises components (A) to (E) described hereinabove. Additives known in the art for inclusion in silicone rubber sponge compounds may be included as well, provided that the objects of the invention are not impaired thereby. Examples of such additives include heat stability agents such as iron oxide, cerium oxide, and fatty acid cerium salts; flame retardants such as manganese carbonate, zinc carbonate, and fumed titanium dioxide; pigments such as red iron oxide, titanium dioxide, and carbon black; and silicone oils such as dimethylsilicone oil and methylphenylsilicone oil.

The present composition can be easily prepared by evenly mixing components (A) to (E) plus any other ingredients that may be required. In preferred practice, component (A) will be premixed with any reinforcing fillers of component (B) to produce a silicone rubber base compound to which are then added components (C), (D), and (E). Where the reinforcing filler is a wet process silica or dry process silica that has not been treated to make it hydrophobic, it is preferable to prepare the silicone rubber base compound adding a plasticizer, such as a dimethylpolysiloxane oligomer endblocked at both terminals with silanol groups, or diphenylsilanediol. Examples of production equipment are kneader mixers, continuous kneader extruders, and other mixing or blending units.

Silicone rubber sponges may be produced from the present composition by heating to a temperature above the softening point of the thermoplastic resin of component (C) and curing. Silicone rubber sponges are formed by blowing and curing of the present composition. Silicone rubber sponges produced in this way have fine, uniform cells and excellent mechanical strength, making them useful as construction material airtight retaining gaskets, fire resistant gaskets, sealing materials, O-rings, and cushioning materials, as well as sheath materials for rollers in copiers and the like.

EXAMPLES

A fuller understanding of the invention is provided through the following examples. Proportions are expressed on a weight basis. Viscosity and Williams plasticity were measured at 25° C. Williams plasticity was measured as follows. Williams plasticity was measured by a plasticity test in accordance with JIS K6249: 1997 "Testing methods for uncured and cured silicone rubber." A tubular test piece (2 cm$^3$ volume) was prepared from silicone gum. The test piece was sandwiched between pieces of cellophane paper and placed in a parallel plate plastometer (WILLIAMS PLASTOMETER manufactured by Shimadzu Seisakusho) equipped with a dial gage. A 49 N load was applied and after 2 minutes the dial gage was read. Test piece thickness (mm) was recorded and multiplied by 100 to give plasticity.

Reference Example 1

A silicone resin (softening point 80° C., specific gravity 1.20) composed of methylsiloxane units and methylphenylsiloxane units in a 22:78 molar ratio was dissolved in dichloromethane and the resultant solution (solids content 30 wt %) was delivered at a rate of 100 cc/min to a dynamic mixer together with pure water delivered at a rate of 25 cc/min, where they were mixed to produce an aqueous dispersion. Using a two fluid nozzle, the aqueous dispersion was sprayed continuously into a spray dryer with a hot nitrogen gas stream as carrier. The hot nitrogen gas stream temperature was 70° C. and pressure was 0.05 MPa. The resultant hollow silicone resin particles were immersed for 24 hours in an aqueous solution consisting of 100 parts pure water and 1 part nonionic surfactant (trimethylnonanol ethylene oxide adduct). Floating hollow silicone resin particles were separated and collected. The hollow silicone resin particles had an average particle size of 40 µm, a shell wall average thickness of 4 µm, and contained nitrogen gas enclosed therein.

Reference Example 2

An acrylic resin with a softening point of 85° C. (trade name ELVACITE 2008 manufactured by DuPont) was dissolved in dichloromethane and the resultant dichloromethane solution (solids content 10 wt %) was delivered at a rate of 100 cc/min to a dynamic mixer together with pure water delivered at a rate of 25 cc/min, where they were mixed to produce an aqueous dispersion. Using a two fluid nozzle, the dispersion was sprayed continuously into a spray dryer with a hot nitrogen gas as carrier. The hot nitrogen gas stream temperature was 80° C. and pressure was 0.025 MPa. The resultant hollow acrylic resin particles were immersed for 24 hours in an aqueous solution consisting of 100 parts pure water and 1 part nonionic surfactant (trimethylnonanol ethylene oxide adduct). Floating hollow acrylic resin particles were separated and collected. The hollow acrylic resin particles had an average particle size of 20 µm, a shell wall average thickness of 4 µm, and contained nitrogen gas enclosed therein.

Reference Example 3

50 Parts of dimethylpolysiloxane (viscosity 100 mPa·s) endblocked at both terminals with trimethylsiloxy groups and 10 parts of dimethylpolysiloxane (viscosity 1800 mPa·s) having three dodecaoxyethylene (—(CH$_2$)$_2$—O—(C$_2$H$_4$O)$_{12}$H) groups on side chains and endblocked at both terminals with trimethylsiloxy groups were placed in flask and agitated vigorously. 40 Parts of deionized water were added gradually and mixed in to prepare a water-in-oil emulsion with an oil component consisting of the dimethylpolysiloxane.

Example 1

100 Parts of an organopolysiloxane gum (viscosity 20,000,000 mPa·s, Williams plasticity 160) composed of 99.6 mol % dimethylsiloxane units and 0.4 mol % methylvinylsiloxane units and endblocked at both terminals with dimethylvinylsiloxy groups, 10 parts of a dimethylsiloxane oligomer endblocked at both terminals with silanol groups and having viscosity of 60 mPa·s, and 40 parts of dry process silica with a specific surface area of 200 m$^2$/g were charged to a kneader mixer and kneaded under heating until homogenous to prepare a silicone rubber base compound. To 100 parts of the silicone rubber base compound were added 0.4 part p-methylbenzoyl peroxide, 0.5 part dicumyl peroxide, 1 part of the hollow silicone particles prepared in Reference Example 1, and 1 part of the oil-in-water emulsion prepared in Reference Example 3. The mixture was evenly kneaded in a two-roll mill to produce a silicone rubber sponge composition. The composition was formed into a sheet 3 mm thick which was then cured by heating in a 230° C. oven for 10 minutes to produce a silicone rubber sponge sheet. The cells of the silicone rubber sponge sheet were substantially uniform and the expansion coefficient was 2.6.

Example 2

The silicone rubber sponge composition of Example 1 was charged to a 65 mmφ(φ=diameter) single screw extruder and extruded into a tube profile. The product was heated for 4 minutes in a 230° C. oven to produce a silicone rubber sponge tube. The cells of the silicone rubber sponge tube were substantially uniform and the expansion coefficient was 2.6.

Example 3

16 cm$^3$ of the silicone rubber sponge composition of Example 1 were charged to a compression mold (32 cm$^3$ cavity capacity) and heated for 15 minutes at 170° C. to produce a silicone rubber sponge sheet. This silicone rubber sponge sheet nicely filled the mold and had uniform cells.

Example 4

100 Parts of an organopolysiloxane gum (viscosity 20,000,000 mpa·s, Williams plasticity 160) composed of 99.6 mol % dimethylsiloxane units and 0.4 mol % methylvinylsiloxane units and endblocked at both terminals with dimethylvinylsiloxy groups, 5 parts of a dimethylsiloxane oligomer endblocked at both terminals with silanol groups and having viscosity of 60 mPa·s, 15 parts of dry process silica with a specific surface area of 200 m$^2$/g, and 25 parts of wet process silica with a specific surface area of 130 m$^2$/g were charged to a kneader mixer and kneaded under heating until homogenous to prepare a silicone rubber base compound. To 100 parts of the silicone rubber base compound were added 1 part of a trimethylsiloxyl-endblocked dimethylsiloxane/methylhydriosiloxane copolymer (viscosity 25 mPa·s), 0.002 part of 1-ethynyl-1-cyclohexanol (a hydrosilylation inhibitor), a chloroplatinic acid/1,3-divinyltetramethyl-disiloxane complex in an amount equivalent to 3 ppm (by weight)as platinum atoms based on the weight of the organopolysiloxane gum, 0.5 part of the hollow acrylic resin particles prepared in Reference Example 2, and 2 parts of the oil-in-water emulsion prepared in Reference Example 3. The mixture was evenly kneaded on a two-roll mill to produce a silicone rubber sponge composition. The composition was formed into a sheet 3 mm thick which was then cured by heating in a 230° C. oven for 10 minutes to produce a silicone rubber sponge sheet. The cells of the silicone rubber sponge sheet were uniform and the expansion coefficient was 3.2.

Example 5

The silicone rubber sponge composition of Example 4 was charged to a 65 mmφ single screw extruder and extruded into a tube profile. The product was heated for 5 minutes in a 230° C. oven to produce a silicone rubber sponge tube. The cells of the silicone rubber sponge tube were substantially uniform and the expansion coefficient was 3.4.

Example 6

16 cm$^3$ of the silicone rubber sponge composition of Example 4 were charged to a compression mold (32 cm$^3$ cavity capacity) and heated for 20 minutes at 170° C. to produce a silicone rubber sponge sheet. This silicone rubber sponge sheet nicely filled the mold and had uniform cells 210 μm in size.

Example 7

The silicone rubber sponge composition prepared in Example 1 was coated onto the outside of a roller core and set in a roller mold. Using a compression mold, the silicone rubber sponge composition was cured by heating for 10 minutes at 170° C. to produce a silicone rubber sponge-sheathed roller. The cells in the silicone rubber sponge were examined and found to be substantially uniform and the expansion coefficient was 2.5.

Example 8

The silicone rubber sponge composition prepared in Example 4 was coated onto the outside of a roller core and set in a roller mold. Using a compression mold, the silicone rubber sponge composition was cured by heating for 10 minutes at 170° C. to produce a silicone rubber sponge-sheathed roller. The cells in the silicone rubber sponge were uniform and the expansion coefficient was 2.9.

Comparative Example 1

A silicone rubber sponge composition was prepared as in Example 1, but omitting the hollow silicone resin particles used in Example 1. The composition was formed into a sheet 3 mm thick which was then cured by heating in a 230° C. oven for 10 minutes to produce a silicone rubber sponge sheet. The expansion coefficient of the silicone rubber sponge sheet was measured and found to be 2.5, but the cells were large and nonuniform.

Comparative Example 2

A silicone rubber sponge composition was prepared as in Example 1, but omitting the water-in-oil emulsion used in Example 1. The composition was formed into a sheet 3 mm thick which was then cured by heating in a 230° C. oven for 10 minutes to produce a silicone rubber sponge sheet. The silicone rubber sponge sheet had uniform cells, but the expansion coefficient was only 1.4.

Comparative Example 3

The silicone rubber sponge composition of Comparative Example 1 was charged to a 65 mmφ single screw extruder and extruded into a tube profile. The product was heated for 5 minutes in a 230° C. oven to produce a silicone rubber sponge tube. The expansion coefficient of the silicone rubber sponge tube was measured and found to be 2.7.

Comparative Example 4

The silicone rubber sponge composition of Comparative Example 2 was charged to a 65 mmφ single screw extruder and extruded into a tube profile. The product was heated for 5 minutes in a 230° C. oven to produce a silicone rubber sponge tube. The expansion coefficient of the silicone rubber sponge tube was measured and found to be 1.3.

Comparative Example 5

16 cm$^3$ of the silicone rubber sponge composition of Comparative Example 1 were charged to a compression mold (32 cm$^3$ cavity capacity) and heated for 15 minutes at 170° C. to produce a silicone rubber sponge sheet. While the silicone rubber sponge sheet filled the mold, the cells were large and nonuniform.

Comparative Example 6

16 cm$^3$ of the silicone rubber sponge composition of Comparative Example 2 were charged to a compression mold (32 cm$^3$ cavity capacity) and heated for 15 minutes at 170° C. to produce a silicone rubber sponge sheet. While the silicone rubber sponge sheet had uniform cells, the expansion coefficient was not adequate for it to fill the mold cavity.

Comparative Example 7

A silicone rubber sponge composition was prepared as in Example 4, but omitting the hollow acrylic resin particles used in Example 4. The composition was formed into a sheet 3 mm thick which was then cured by heating in a 230° C. oven for 10 minutes to produce a silicone rubber sponge sheet. The expansion coefficient of the silicone rubber sponge sheet was 3.0, but the cells were large and nonuniform.

Comparative Example 8

A silicone rubber sponge composition was prepared as in Example 4, but omitting the water-in-oil emulsion of Reference Example 3 used in Example 4. The composition was formed into a sheet 3 mm thick which was then cured by heating in a 230° C. oven for 10 minutes to produce a silicone rubber sponge sheet. The silicone rubber sponge sheet had uniform cells, but the expansion coefficient was only 1.6.

Comparative Example 9

The silicone rubber sponge composition of Comparative Example 7 was charged to a 65 mm$\phi$ single screw extruder and extruded into a tube profile. The product was heated and cured for 5 minutes in a 230° C. oven to produce a silicone rubber sponge tube. The expansion coefficient of the silicone rubber sponge tube was measured and found to be 3.0, but the cells of the sponge were extremely large and nonuniform.

Comparative Example 10

The silicone rubber sponge composition of Comparative Example 8 was charged to a 65 mm$\phi$ single screw extruder and extruded into a tube profile. The product was heated and cured for 5 minutes in a 230° C. oven to produce a silicone rubber sponge tube. The silicone rubber sponge tube had uniform cells, but the expansion coefficient was only 1.5.

Comparative Example 11

16 cm$^3$ of the silicone rubber sponge composition of Comparative Example 7 were charged to a compression mold (32 cm$^3$ cavity capacity) and heated and cured for 15 minutes at 170° C. to produce a silicone rubber sponge sheet. While the rubber sponge sheet filled the mold, the cells were large and nonuniform.

Comparative Example 12

The silicone rubber sponge composition of Comparative Example 8 was charged to a compression mold (32 cm$^3$ cavity capacity) and heated and cured for 15 minutes at 170° C. to produce a silicone rubber sponge sheet. While the silicone rubber sponge sheet had uniform cells, the expansion coefficient was not adequate for it to fill the mold cavity.

What is claimed is:

1. A silicone rubber sponge composition comprising
   (A) 100 parts by weight organopolysiloxane gum described by average structural unit $R_aSiO_{(4-a)/2}$, where R is a monovalent hydrocarbon group or haloalkyl and a is 1.8 to 2.3 and having a viscosity at 25° C. of 1,000,000 mPa·s or above,
   (B) 1 to 400 parts by weight inorganic filler,
   (C) 0.01 to 50 parts by weight hollow thermoplastic resin particles,
   (D) 0.01 to 10 parts by weight water-in-oil emulsion with silicone oil as an oil phase, and
   (E) a curing agent in an amount sufficient to cure the composition.

2. The silicone rubber sponge composition according to claim 1, where component (C) comprises thermoplastic resin shells having a softening point of from 40° C. to 200° C. and having a gas enclosed therein.

3. The silicone rubber sponge composition according to claim 1, where the thermoplastic resin of component (C) is selected from the group consisting of silicone resin, acrylic resin, and polycarbonate resin.

4. The silicone rubber sponge composition according to claim 1, where component (A) has a viscosity at 25° C. of 5,000,000 mPa·s or above.

5. The silicone rubber sponge composition according to claim 1, comprising 1 to 100 parts by weight reinforcing filler as component (B).

6. The silicone rubber sponge composition according to claim 1, where component (C) has a softening point of 60 to 180° C. and an average particle size of 1 to 50 $\mu$m.

7. The silicone rubber sponge composition according to claim 1, where component (C) comprises 0.1 to 40 parts by weight per 100 parts by weight of component (A).

8. The silicone rubber sponge composition according to claim 1, where the silicone oil of component (D) is a trimethylsilyl endblock dimethylpolysiloxane oil.

9. The silicone rubber sponge composition according to claim 1, where the silicone oil of component (D) is a dimethylhydroxysilyl endblocked dimethylpolysiloxane oil.

10. The silicone rubber sponge composition according to claim 1, where the silicone oil of component (D) has a viscosity at 25° C. of from 10 to 100,000 mPa·s.

11. The silicone rubber sponge composition according to claim 1 comprising from 0.1 to 5 parts by weight component (D) per 100 parts by weight of component (A).

12. A silicone rubber sponge article comprising the reaction product of a composition comprising
   (A) 100 parts by weight organopolysiloxane gum described by average structural unit $R_aSiO_{(4-a)/2}$, where R is a monovalent hydrocarbon group or haloalkyl and a is 1.8 to 2.3 and having a viscosity at 25° C. of 1,000,000 mPa·s or above,
   (B) 1 to 400 parts by weight inorganic filler,
   (C) 0.01 to 50 parts by weight hollow thermoplastic resin particles,
   (D) 0.01 to 10 parts by weight water-in-oil emulsion with silicone oil as an oil phase, and
   (E) a curing agent in an amount sufficient to cure the composition.

13. A silicone rubber sponge article according to claim 12, where the article is selected from the group consisting of a sheet, tube, gasket, and sheath material for a roller.

14. A silicone rubber sponge article according to claim 12 prepared by a process selected from the group consisting of extrusion molding and compression molding.

* * * * *